Patented June 15, 1948

2,443,353

UNITED STATES PATENT OFFICE 2,443,353

PRODUCTION OF ORGANOSILOXANES

James Franklin Hyde and William Herbert Daudt, Corning, N. Y., assignors to Corning Glass Works, Corning, N. Y., a corporation of New York No Drawing. Application February 21, 1946, Serial No. 649,384

5 Claims. (Cl. 260—448.2)

The present invention relates to the production of organosiloxanes, and in particular, involves the interaction of differently substituted diorganosiloxane polymers.

This application is a continuation-in-part of our co-pending application Serial No. 481,153, filed March 30, 1943, and assigned to the assignee of the present invention.

The siloxanes produced by the condensation of dialkyl siloxanes are desirable oils. These oils are useful for many purposes, such as for lubricating moving surfaces either in bearings or in glass cloth and yarn, for surface treating of glass and other materials to render them hydrophobic and for temperature control and damping media. These oils are likewise useful as raw materials for the production of gels and resins, which are produced by cross-linking the siloxane molecule, as by the elimination of some of the organo radicals.

Improved siloxanes are obtainable by including in the polymer molecules diorganosiloxane units carrying at least one aryl radical along with the dialkyl siloxane units. These improved siloxanes have improved stability over, and better lubricity than, the corresponding dialkylsiloxanes not containing the aryl substituents.

The dialkylsiloxane and the diorganosiloxanes in which at least one of the organo radicals is an aryl radical are generally immiscible. The two do not react to form a single material when mixed. These two types of siloxanes, in general, are soluble in solvents such as toluene, and it would be expected that the addition of relatively limited quantities of toluene sufficient to dissolve both of the siloxanes would result in a single phase. However, where this has been tried by mixing toluene solutions of the two, the result has been two liquid phases instead of the expected single phase. When it is desired to prepare high polymers of such a pair of materials, it is desirable to have the two in a single phase preferably as intercondensates containing both types of siloxane units. It has now been found that a single phase containing the two may be obtained by interaction thereof under proper conditions.

An object of the present invention is the provision of simple and efficacious methods for the production of copolymers of dialkyl siloxane units and diorganosiloxane units in which at least one organo radical is an aryl radical from the two respective immiscible diorganosiloxane polymers.

In accordance with the present invention copolymers of the type indicated are produced by the interaction of the respective immiscible siloxanes in the presence of a strong alkali hydroxide. The siloxane product of the interaction may have either a higher, substantially the same, or a lesser degree of condensation than the reacting siloxanes.

The siloxanes which are interacted, in accordance herewith, are diorgano substituted, i. e., they carry two organo radicals per silicon atom, with the radicals linked to the silicon by carbon to silicon bonds. The diorganosiloxane in which at least one of the organo radicals is an aryl radical may be either an alkylarylsiloxane, a diaryl siloxane or an intercondensate thereof. The aryl radical or radicals may be phenyl or a substituted phenyl such as tolyl, xylyl, 2-mesityl and xenyl. The alkyl group which may be one of the substituent radicals of this siloxane and the alkyl groups of the dialkyl siloxane may contain, in general, between 1 and 18 carbon atoms. The siloxanes which are interacted may be completely condensed materials, such as the cyclic diorganosiloxanes, or only partially condensed, such as the linear siloxanes. The cyclics, of which a considerable number have been prepared heretofore, contain a ring structure of alternating silicon and oxygen atoms with two organo radicals bonded to each silicon atom. The linear siloxanes contain a chain of alternating silicon and oxygen atoms with two organo radicals bonded to each silicon, which chain is end blocked at both ends with a hydroxyl, ethoxy or like material. This wide latitude in the application of the present process is due to the organo radicals being non-reactive portions of the molecules in this process, the reaction involving the silicon-oxygen bonds only. However, when diarylsiloxane units are present, it is preferred that this type of unit be present in amount less than 60% on a prime mol per cent basis (mol per cent calculated on the molecular weight of the siloxane units independently of the degree of condensation). When more than this amount is present a portion thereof may be in excess of the amount which will react to form an intercondensate.

The strong alkali hydroxide which is employed is preferably an alkali metal hydroxide such as sodium or potassium hydroxide, due to the commercial availability of these materials. Other strong alkali hydroxides, such as the quaternary ammonium hydroxides, may be employed. The function of the alkali in the present process is to cause the silicon to oxygen bonds to function ionically. It has been found that the strong alkali hydroxides effectuate this ionic action over a wide range of proportions. Thus, the silicon to oxygen bonds have been found to function ionically in the presence of as small amounts of alkali as 7000 atoms of silicon per atom of alkali metal and also when the alkali metal hydroxide is present in amount in excess of the atomic equivalent of the silicon present. Whereas the ionic action of these bonds is obtained over a wide range, in order to produce the interaction products in accordance with this invention, the alkali should be present only in amount up to one equivalent of alkali hydroxide per silicon. Preferably less than one-half equivalent of alkali hydroxide per silicon is employed, whereby extensive interaction in the presence of the alkali is obtained.

Water is generally present in the system during the interaction. Thus, when a siloxane reacts with an alkali hydroxide, water may be produced by condensation of the silanol. Also, when the siloxanes contain hydroxyl groups, these groups may be eliminated with the formation of water during the process. It is further possible to add the alkali hydroxide as aqueous solution which introduces more water into the system. In order to effect rapid interaction, it is preferred that the extraneous water (that not derived from hydroxyl groups in the diorganosiloxane and in the alkali hydroxide) introduced into the system be in amount not greater than 1.5 times the amount of alkali hydroxide, by weight. When the alkali metal hydroxide is added as aqueous solution, it is preferred that the concentration be at least 40% by weight, or if less, that water be removed from the system during the course of interaction to this extent.

In order to initiate the interaction, it is frequently desirable that an organic solvent for the siloxanes be included in the reaction mixture. The solvent may be either a polar or non-polar solvent, such as alcohol, dioxan, or benzene. The desired interaction between the two diorganosiloxanes is obtained independently of the presence of the solvent or the amount of solvent. The amount of solvent, however, does have an effect upon the distribution of the types of interaction products obtained. Small amounts of solvent result in minimal production of cyclic interaction products. The polymer size, in this instance, will be to large extent dependent upon the amount of alkali present. The presence of substantial amounts of solvents, together with only a small amount of alkali, for example, a silicon to sodium atomic ratio of 15 or more, promotes the formation of large quantities of cyclic interaction products.

The interaction hereof may be effected over a wide range of temperature from below room temperature to elevated temperature. The main difference effected by change of temperature is variation in rate of reaction. When temperatures sufficiently elevated to cause cleavage of organic radicals are employed, the average degree of substitution is decreased, whereby the molecular complexity of the molecules produced is increased, with accompanying changes in the physical properties of the product. By such means it is possible to produce gels and solid resins from reaction mixtures having a degree of substitution of 2 and which would normally yield either solid low polymers or liquid higher polymers.

Following interaction in accordance with the process hereof, it is desirable to eliminate the alkali either by neutralization, by washing with water, or by distillation in the case of low boiling products. Removal of the alkali is desirable in order to stabilize the products and thereby prevent further rearrangement, due to shifting equilibria, depending upon the conditions to which the product is subjected.

For a better understanding of this invention, reference may be had to the following examples which should be considered only as illustrative of the method hereof:

Example 1

A mixture was prepared of 1 part of a dimethylsiloxane fluid having a viscosity of 450 cs. at 25° C. and an ethylphenylsiloxane fluid. These two fluids were immiscible and formed a 2-phase system. The mixture was warmed and remained heterogenous. One-eighth part of solid sodium hydroxide was added whereupon the warmed mixture went into solution in a few minutes. The warm mixture became homogeneous after 10 minutes and did not separate upon cooling. The product was dissolved in ether, the alkali neutralized, the solution washed with water and then concentrated to remove the ether. There was thereby obtained a copolymer of relatively low viscosity containing dimethyl and phenylethylsiloxane units. This oil was resinified by blowing with air at 250° C., whereby a high copolymer of the two types of siloxanes was obtained. In the process here employed, the atomic ratio of silicon to sodium was about 7.

Example 2

A mixture was prepared of one part by weight of each of the siloxanes referred to in Example 1. To this mixture there was added ⅕ part of a 37% aqueous solution of benzyltrimethylammonium hydroxide. The mixture was then stirred at 180° C. for one-half hour. Water was thereby boiled off and the siloxane reacted to give a homogeneous product. The heating was containued to decompose the alkali hydroxide. During reaction, the ratio of silicon to hydroxide on an equivalent basis was about 25.

Example 3

Equivalent weights of the cyclic trimers of diphenylsiloxane and dimethylsiloxane were mixed. The two were immiscible. Sufficient solid sodium hydroxide was added to give an atomic ratio of silicon to sodium of 100. A small amount of ether was added to help disperse the sodium hydroxide. The mixture so prepared was warmed whereby the ether was driven off. The mixture was then heated at 100° C. for 24 hours, during which time viscous liquid began to form and the crystalline diphenylsiloxane was slowly disappearing. The mixture was heated for an additional period of 48 hours at a temperature between 100 and 130° C. A clear viscous sticky liquid copolymer was thereby produced.

Example 4

Equivalent weights of the cyclic trimers of diphenylsiloxane and dimethylsiloxane were mixed. Sufficient sodium hydroxide, as 50 per cent aqueous solution, was added to give an atomic ratio of silicon to sodium of 100. Benzene was added in amount 1.1 times the weight of the reaction mixture. This mixture was held at 70 to 80° C. with stirring for 18 hours, and with the solvent evaporating slowly. There was thereby produced a semi-crystalline mass which was held at 180° C. with stirring for 24 hours. The reaction product was washed free of alkali. After being held at 250° C. for 2.5 hours, the product flowed at 250° C. and was slightly less tacky at 25° C. An analysis showed this product contained 80.3 mol. per cent of diphenylsiloxane units and 19.7 mol. per cent of dimethylsiloxane units.

*Example 5*

The cyclic trimers of diphenylsiloxane and dimethylsiloxane were mixed in the relative proportions of 1 mol. and 9 mols., respectively. Sufficient sodium hydroxide was added as 50% aqueous solution, to give a silicon to sodium ratio of 100. The mixture was warmed to 60 to 70° C. to melt the material. After 18 hours a viscous homogeneous liquid was produced. This liquid was heated to 110° C. for 35 hours whereby the viscosity was increased. It was then washed with water to free it of alkali. A sample of the clear resin on a plate was soft and slightly tacky at 25° C. It had very little flow at 250° C. and changed very little after 5 days at 250° C. Analysis showed that the copolymer produced contained 70 mol. per cent of dimethylsiloxane units and 30 mol. per cent of diphenylsiloxane units.

*Example 6*

A mixture was prepared of 65 parts of a crystalline solid hydrolysis product of dichlorodiphenylsilane and 48 parts of a dimethylsiloxane polymeric fluid having a viscosity of 450 cs. The two siloxanes were immiscible. 55 parts of potassium hydroxide were added and the mixture was refluxed with ethanol and dioxan for 2 hours. The siloxane was extracted with ether and the ethereal solution acidified, washed and concentrated, whereby a neutral viscous oil was obtained which was a copolymer of the diphenyl and dimethyl siloxanes. This oil was air blown for 3 hours at 250° C. A highly viscous material was thereby produced and was applied to a piece of fiber glass tape. The material set to a resin in less than 16 hours at 250° C. The impregnated tape was soft, flexible, tough and durable.

We claim:
1. A method of preparing siloxanes which comprises interacting a dialkyl siloxane with a diorgano siloxane of the type RR'SiO where R is a monocyclicaryl radical and R' is selected from the group consisting of alkyl and monocyclicaryl radicals, said dialkyl siloxane and diorgano siloxane being immiscible, effecting the interaction in intimate contact with an alkali metal hydroxide in amount less than one equivalent of alkali metal hydroxide per silicon atom.
2. A method in accordance with claim 1 in which the diorgano siloxane is an alkyl monocyclicaryl siloxane.
3. A method in accordance with claim 1 in which the diorgano siloxane is a dimonocyclicaryl siloxane.
4. A method in accordance with claim 1 in which the alkali metal hydroxide is present in amount less than one half equivalent of alkali hydroxide per silicon atom.
5. A method in accordance with claim 1 in which the diorgano siloxane is a dimonocyclicaryl siloxane, said siloxane being present in amount less than 60% on a prime mol basis.

JAMES FRANKLIN HYDE.
WILLIAM HERBERT DAUDT.

REFERENCES CITED

The following references are of record in the file of this patent:

UNITED STATES PATENTS

| Number | Name | Date |
| --- | --- | --- |
| 2,258,218 | Rochow | Oct. 7, 1941 |
| 2,258,220 | Rochow | Oct. 7, 1941 |
| 2,258,222 | Rochow | Oct. 7, 1941 |
| 2,371,050 | Hyde | Mar. 6, 1945 |
| 2,382,082 | McGregor et al. | Aug. 14, 1945 |
| 2,386,441 | Daudt | Oct. 9, 1945 |
| 2,386,466 | Hyde | Oct. 9, 1945 |

OTHER REFERENCES

Kipping et al., Jour. Chem. Soc. (London), 105 (1914), pages 484–500.

Meads et al., Jour. Chem. Soc. (London), 105 (1914), pages 679–690.

Hyde et al., Jour. Amer. Chem. Soc. 63 (1941), pages 1194–1196.